United States Patent [19]

Harvey

[11] Patent Number: 5,003,340
[45] Date of Patent: Mar. 26, 1991

[54] EXPOSURE CONTROL WITH REDUCED SHUTTER SPEED FOR TELE/PAN CAMERA

[75] Inventor: Donald M. Harvey, Webster, N.Y.

[73] Assignee: Eastman Kodak Company, Rochester, N.Y.

[21] Appl. No.: 486,463

[22] Filed: Feb. 28, 1990

[51] Int. Cl.$^5$ .............................................. G03B 7/08
[52] U.S. Cl. .................................... 354/456; 354/106
[58] Field of Search ............. 354/441, 446, 456, 481, 354/105, 106

[56] References Cited

U.S. PATENT DOCUMENTS

| Re. 32,797 | 12/1988 | Harvey | 354/481 |
| 3,842,423 | 10/1974 | Craig et al. | 354/29 |
| 4,027,317 | 5/1977 | Hausser et al. | 354/289 |
| 4,312,579 | 1/1982 | Araki | 354/29 |
| 4,352,548 | 10/1982 | Toyoda | 354/286 |
| 4,639,111 | 1/1987 | Harvey | 354/481 |
| 4,652,104 | 3/1987 | Harvey | 354/106 |
| 4,768,047 | 8/1988 | Taniguchi et al. | 354/446 |
| 4,887,108 | 12/1989 | Taniguchi et al. | 354/446 |

*Primary Examiner*—Russell E. Adams
*Attorney, Agent, or Firm*—Roger A. Fields

[57] ABSTRACT

A tele/pan camera is provided with automatic means cooperating with exposure control circuitry to reduce blur in a portion of an exposed frame coded for subsequent pseudo format enlargement, for increasing the normal shutter speed, with corresponding adjustment of other exposure parameters, in response to selection of the pseudo format.

6 Claims, 2 Drawing Sheets

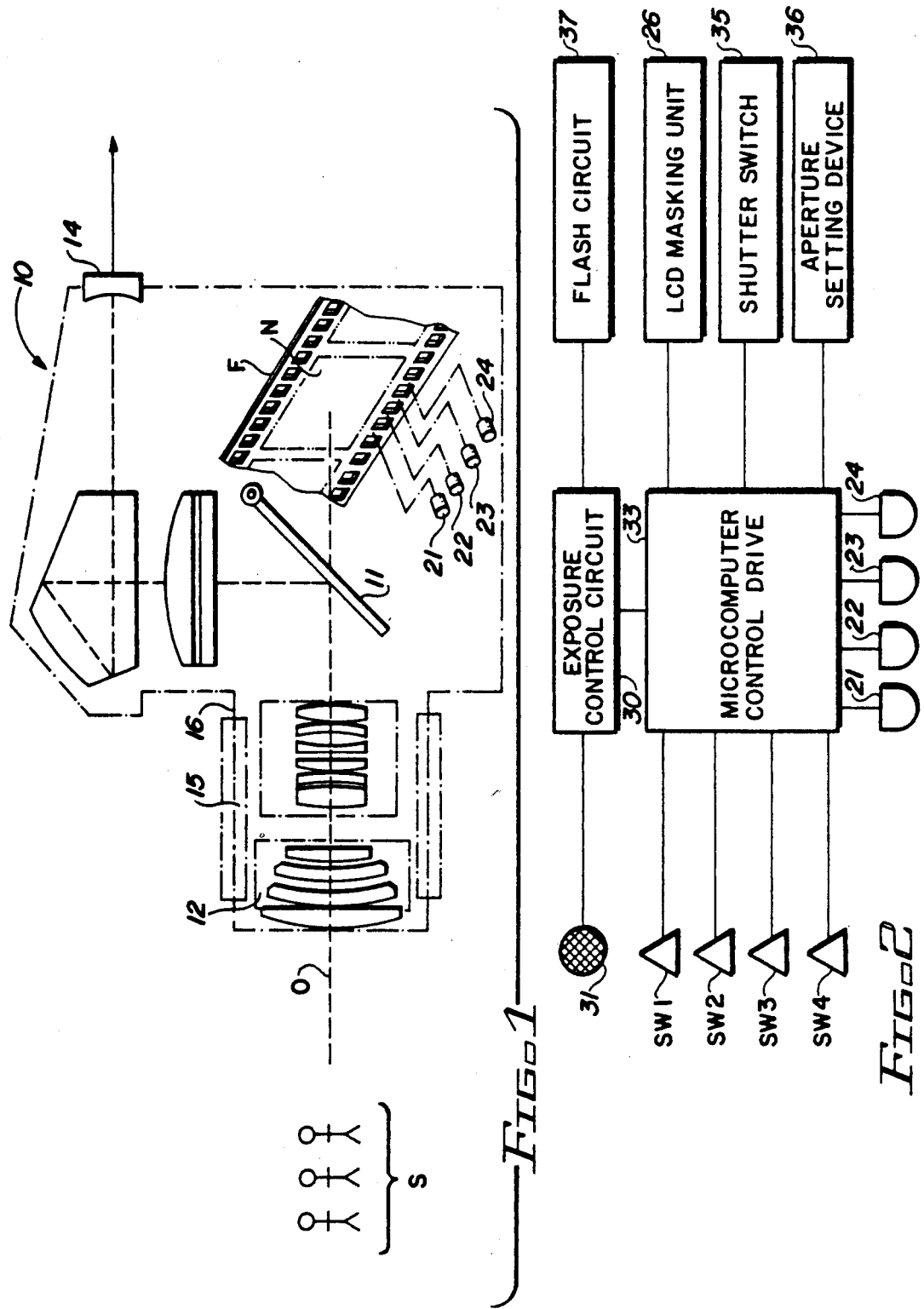

EXPOSURE CONTROL WITH REDUCED SHUTTER SPEED FOR TELE/PAN CAMERA

The present invention relates generally to exposure control for a camera; and, more particularly, to control of exposure in a tele/pan camera to provide a faster shutter speed for exposures made in selected pseudo telephoto or pseudo panoramic format.

BACKGROUND OF THE INVENTION

A tele/pan camera is a camera that enables telephoto and panoramic prints to be produced from film frame exposures made without the corresponding telephoto and panoramic lenses by coding the film at the time of exposure to identify variations from normal processing to be taken subsequently during printing in order to simulate the same desired effect.

A pseudo telephoto print is one that is made from a central portion of an exposure having the same width-to-length ratio (e.g., 3½:5) as that of the whole exposure recorded by the camera at the time the picture is taken. During the printing process, the frame negative image is masked at upper, lower, left and right marginal zones, leaving the central portion unobscured to be printed with increased magnification for obtaining an enlargement of normal print size. The enlargement has the same width-to-length ratio as that of the non-masked central portion. Thus, in response to coding the film at the time the exposure is made, the central portion of the exposure is magnified at the time of printing beyond the normal magnification for the camera lens employed to take the picture, and the resulting print will have a telephoto or close-up format appearance.

A pseudo panoramic print is one that is made from a narrow portion of an exposure having a greater width-to-length ratio (e.g., 1:3) than that of the original exposure recorded by the camera. During the printing process, the negative frame image is masked at upper and/or lower marginal zones, leaving the narrow portion unobscured. An enlargement is then made of the narrow, non-masked portion to provide a print having the same width-to-length ratio as that of the narrow portion. Thus, in response to coding the film at the time the exposure is made, the field of view is adjusted at the time of printing, to provide a print which has a panoramic or elongate format appearance.

U.S. Pat. No. 3,490,844 discloses a method of making a print of a selected portion of a subject to be photographed. The method comprises the steps of: viewing the subject in the viewfinder of a camera; manually adjusting mechanical masking member visible in the viewfinder to frame a selected portion of the subject; exposing the film in the camera to obtain a latent image of the subject; encoding the exposure on the film with indicia representative of the selected portion of the subject; processing the film to obtain a negative of the latent image of the subject; and sensing the indicia to make a print of the selected portion of the subject from the negative.

When the selected portion of the subject has the same relative position in the viewfinder as a corresponding portion of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

U.S. Pat. No. 4,357,102 discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2, and preferably 1:3. Exposures are taken with the viewfinder window partially masked and, during the printing of the negative, the negative image is correspondingly masked to provide a non-masked portion having the same width-to-length ratio as that of the unobscured portion of the viewfinder window. Printing paper with a similar width-to-length ratio is used. Prints can thus be obtained which have a panoramic or elongate format without using a panoramic lens.

U.S. Pat. No. 4,639,111 discloses an improved exposure control system for a tele/pan camera. An exposure control photocell is provided to measure the brightness of light reflected from the subject to be photographed. Light control means in the camera controls the amount of reflected light reaching the photocell. The reflected light is controlled in accordance with the amount of light available to a selected pseudo telephoto or pseudo panoramic field of view reduced from the actual field of view of the camera objective lens. Thus, in a tele/pan camera the portion of the film frame covered by the selected pseudo field of view can be more accurately exposed. No consideration is given to choice of shutter speed based on pseudo format selection, beyond normal consideration of the light available.

In a tele/pan camera, the effect of camera or subject motion is more pronounced when the magnification of the exposed negative is increased during printing, as required to obtain the desired pseudo telephoto or pseudo panoramic effect. So, in addition to adjusting the exposure for the amount of light available to a pseudo format field of view (i.e., the field of view subsequently printed), as contrasted with the actual field of view seen by the objective lens (i.e., the field of view of the full exposure), it is desirable to employ a shorter exposure time or faster shutter speed when pseudo telephoto or pseudo panoramic format is selected.

SUMMARY OF THE INVENTION

According to the invention, a pseudo telephoto-pseudo panoramic ("tele/pan") camera includes an exposure control system for automatically increasing the shutter speed used for exposure of a selected pseudo telephoto ("tele") or pseudo panoramic ("pan") field of view, as compared to the shutter speed automatically selected for exposure at the same lighting of an actual field of view of a camera objective lens, and for automatically compensating for such shutter speed increase by boosting other exposure parameters, such as by increasing aperture size or activating a flash unit.

In a preferred embodiment, discussed in greater detail below, a tele/pan camera has means for selecting among "tele," "pan" and "normal" film coding positions, respectively corresponding to pseudo telephoto, pseudo panoramic and actual field of view formats desired in subsequent printing. A photocell in the exposure system of the camera is disposed to receive ambient light from the subject to be photographed in accordance with the designated pseudo format selection, so that an exposure setting can be determined in accordance with the amount of light available to the field of view selected for subsequent printing. However, unlike in known arrangements, a shutter "open" time is set for "tele" or "pan" selections, which is shorter than the shutter speed which would be employed for a "normal" selection under the same lighting conditions. In order to compensate for the increase in shutter speed, a corresponding change in aperture or flash setting is made.

BRIEF DESCRIPTION OF THE DRAWINGS

An embodiment of the invention has been chosen for purposes of description and illustration, and is shown in the accompanying drawings, wherein:

FIG. 1 is a schematic view showing general features of a tele/pan camera within which an embodiment of the invention can be implemented;

FIG. 2 is a block diagram showing embodiments of apparatus usable in the camera of FIG. 1 in accordance with the principles of the invention.

Throughout the drawings, like elements are referred to by like numerals.

DETAILED DESCRIPTION OF THE PREFERRED EMBODIMENT

Figure 3:
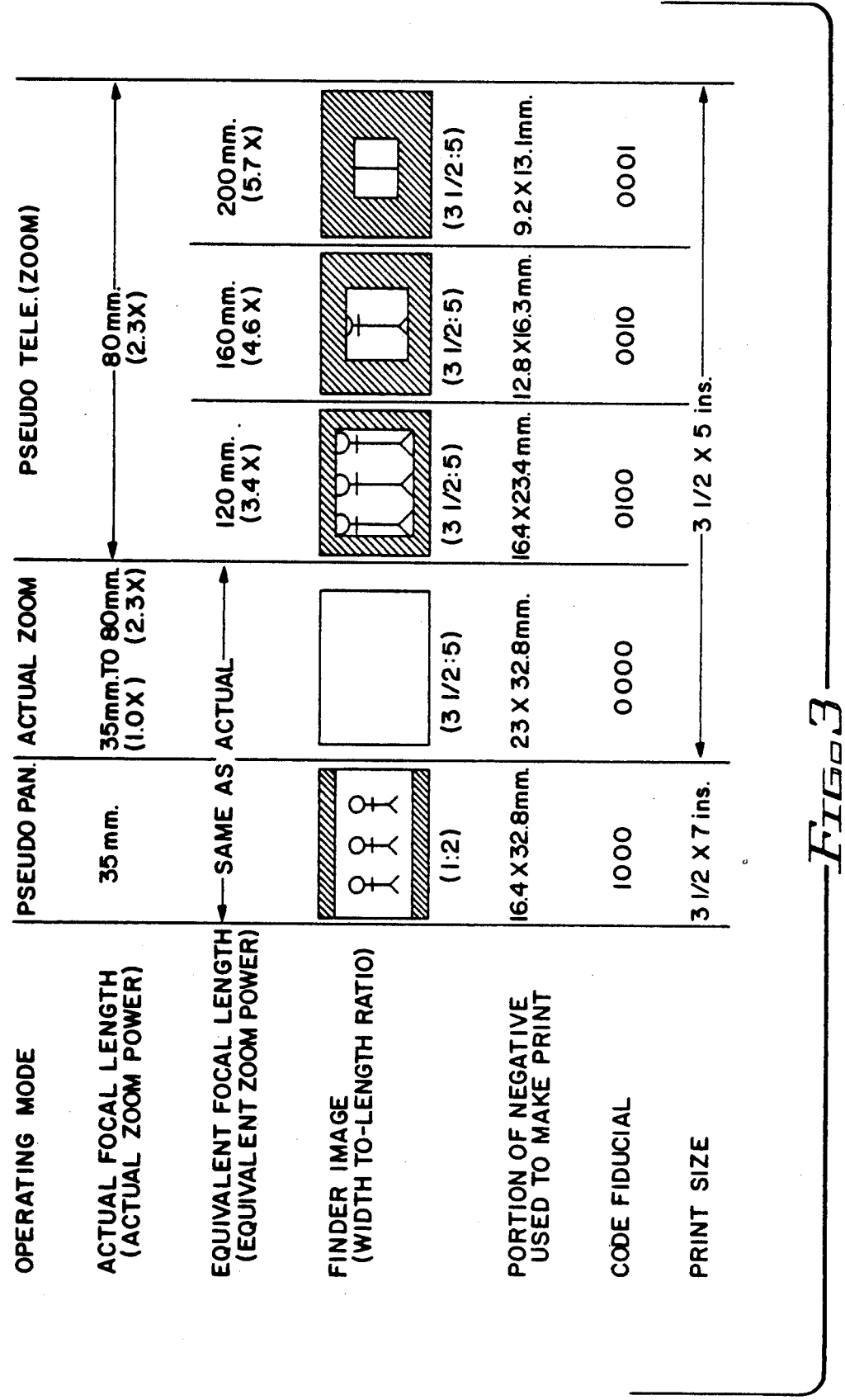
FIG. 3 is a chart explaining how the camera of FIG. 1 is operated to enable pseudo telephoto and pseudo panoramic prints to be obtained from normal exposures coded to identify the selected type print, exposed under conditions set in accordance with an embodiment of the invention.

An embodiment of the present invention is described by way of implementation in a tele/pan photographic camera system of the type described in U.S. Pat. Nos. 4,583,831; 4,639,111 and 4,652,104 to the same inventor, referenced above, the disclosures of which are incorporated herein by reference thereto. Such a camera enables pseudo telephoto and pseudo panoramic prints to be produced from exposed film frames by coding the film frame to identify the pseudo format selected for subsequent printing. As shown in FIG. 1, a tele/pan camera in the form of a single-lens-reflex (SLR) camera 10 includes an objective lens 12 of variable focal length for focusing an image of a subject S along an optical axis O onto a frame section N of a film F supported in the focal plane of the lens 12 to take an exposure. A viewfinder 14 permits viewing the subject S being photographed when a flip-up mirror 11 is in its flipped down position shown. The lens 12 may be a fixed lens, or may be a variable focal length zoom lens as shown which has means for varying the actual angular field of view (coverage) seen upon exposure by the frame N, by rotation of a zoom ring 15. Provision is made for rotation of the ring 15 beyond its actual field of view settings to a plurality of pseudo telephoto settings, without moving the objective lens from its last established focal length. For example, as with the arrangement disclosed in the '111 patent, the ring 15 may be set to a selected 120 mm, 160 mm or 200 mm pseudo telephoto setting, without moving the objective lens from its longest (telephoto) focal length of 80 mm. Conversely, the ring 15 can be rotated in an opposite direction beyond its shortest focal length (viz. 35 mm) setting to a pseudo panoramic setting, without moving the objective lens from its shortest (wide-angle) focal length. Indications of the 120 mm, 160 mm and 200 mm pseudo telephoto settings and of the pseudo panoramic setting may be embossed on the visible surface of the cylindrical barrel 16 of the lens 12, at positions located beyond the longest and shortest focal length indications. It is noted that the movement of the ring 15 from the "normal" longest or shortest focal length setting (which corresponds to a field of view coincident with the actual field of view observed by the objective lens 12) to either a "tele" or "pan" setting (which corresponds to a desired field of view different from that actually observed by the lens 12) occurs without a corresponding change in the focal length of the objective lens 12.

Four light emitting diodes (LED's) 21, 22, 23, 24 are disposed in evenly-spaced relationship in the camera 10 for selective energization to spot-expose various code fiducials in binary form on the film F adjacent the frame section N, as shown schematically in FIG. 1. Selective energization of the LED's 21, 22, 23, 24 is controlled by individually closing respective switches SW1, SW2, SW3, SW4 (FIG. 2) located in the camera 11. The switches may be configured to be respectively closed, for example, as the ring 15 is selectively moved to each of the pseudo formal settings, i.e., pan, 120 mm, 160 mm and 200 mm. The binary form of the resulting code fiducial exposed adjacent the film frame N identifies the particular pseudo setting of the ring 15. When the ring 15 is turned to a position of alignment with the pseudo panoramic indication on the barrel 16, for instance, the switch SW1 is closed and the LED 21 will energize in connection with exposure of the image of subjects to encode the film adjacent frame N with the binary code fiducial 1000. Similarly, turning the ring 15 to its 120 mm, 160 mm or 200 mm pseudo telephoto settings will close the respective switches SW2, SW3 and SW4 to energize the corresponding LED's 22, 23 and 24, so that the binary fiducial codes 0100, 0010 and 0001 will be imaged. When the ring 15 is rotated to one of its normal shortest to longest actual zoom lens settings (i.e., settings for which the whole frame negative image is to be printed as recorded), the switches SW1-SW4 all remain open so that none of the LED's are energized. This has the same effect as imaging a binary code fiducial 0000 for "normal" exposures.

FIG. 3 is a chart illustrating how the camera 10 is used to expose film frames from which pseudo panoramic and pseudo telephoto, as well as actual wide-angle to actual telephoto prints, can be produced. The finder image is shown as it would appear utilizing a known liquid crystal display (LCD) masking unit.

When the ring 15 is in its panoramic setting, the actual focal length of the objective lens is at its wide-angle 35 mm setting and the code fiducial 1000 is exposed adjacent to film frame N in response to closing of switch SW1. During the printing operation, sensing the code fiducial 1000 causes the negative to be masked along its upper and lower marginal zones in conformity with the desired wide-angle, narrow field of view and an enlargement is made of the narrow, non-masked portion of the negative (i.e., 16.4×32.8 mm portion) to provide a pseudo panoramic 3.5×7 ins. print. When the ring 15 is in its 200 mm telephoto setting, for example, the actual focal length of the objective lens is at its longest telephoto limit (i.e., 80 mm), but the desired focal length effect for the subsequent print is that of a lens having a 200 mm focal length. The code fiducial 0001 is exposed adjacent the film frame N in response to closing of the switch SW4. During the printing operation, sensing of the code fiducial 0001 causes the negative to be masked along its upper, lower, left and right marginal zones as indicated in the rightmost column of the chart of FIG. 3. An enlargement is then made of the central, non-masked portion of the negative (i.e., 9.2×13.1 mm portion) to provide a pseudo telephoto 3.5×5 ins. print. Similarly, when the ring 15 is in its 160 mm or 120 mm telephoto setting, the actual focal length of the objective lens remains at its telephoto limit, and the code fiducial 0100 or 0010 is exposed adjacent the film frame F in response to the closing of the switch SW2 or SW3. During the printing operation, sensing of the respective code fiducial causes the negative to be correspondingly masked and a proper selection of magnification is made to produce an enlargement of the central, non-masked portion of the negative (i.e., 16.4×23.4 mm or 23×32.8 mm) to provide a pseudo telephoto 3.5×5 ins. print. It is noted that the magnification employed during printing of the pseudo panoramic and pseudo telephoto encodings will be greater than that employed for "normal" printing of the full exposure frame.

A liquid crystal display (LCD) masking unit 26 (FIG. 2) similar to that employed in the camera described in the referenced patents may be employed with appropriate modification to mask the configuration in the finder field of the viewfinder 14, so that the masking configuration corresponds to the pseudo format settings of the ring 15, shown in FIG. 3. An exposure control circuit 30 (FIG. 3) for controlling the diaphragm aperture and/or the shutter speed in the camera 10 may include a photosensitive element, such as a photocell 31 to provide a measure of the brightness of light reflected from the subject S being photographed. The photocell may be arranged, as described in the '111 patent, to measure the light attributable to that portion of the actual field of view of lens 12 which will be enlarged during subsequent printing.

When the ring 15 is in its pseudo panoramic or "pan" setting, the finder field (see FIG. 3) is partially masked. The non-masked portion of the finder field is narrower than (reduced from) the actual field of view of the objective lens 12. Moreover, it takes in the same portion of the subject as is imaged on the narrow portion of the film frame N to be subsequently enlarged to produce the pseudo panoramic print. Thus, if the photocell 31 is positioned to measure only the amount of light reflected from the subject S to the non-masked portion of the field of view of the finder 14, the measured light will be proportionate to the amount of reflected light that would be available to an objective lens panoramic field of view that is being simulated. Accordingly, positioning the photocell 31 to measure only the non-masked portion of the finder field of view will permit the connected control circuit 30 to determine an appropriate exposure setting based on lighting for correct exposure of the portion of the film frame N covered by the finder field of view.

If the finder 14 were employed in a camera having a finder zoom lens with a focal length range 200 mm, 160 mm or 120 mm beyond the range of the objective lens 12 sufficient to cover the pseudo telephoto settings, as described in U.S. Pat. No. 4,652,104, the finder's field would not be masked for the "tele" settings. The actual focal length of the finder lens would be either 120 mm, 160 mm or 200 mm; though, the focal length of the objective lens would remain fixed at 80 mm. The telephoto field of view of the viewfinder would take in the same portion of the subject S as is imaged on the portion of the film frame N to be subsequently enlarged during printing to produce the pseudo telephoto print. Thus, positioning the light sensor 31 to view the finder lens field of view would provide measurement, without masking, at the pseudo telephoto settings of light reflected from the subject S corresponding to the portion to be subsequently printed. Accordingly, in accordance with conventional techniques, a determination can be made of an aperture and/or shutter speed setting for accurate exposure at the pseudo format selections; however, without consideration that the subsequent greater enlargement of "pan" or "tele" setting exposures will magnify any effect of movement over "normal" printings. The exposure control system of the present invention modifies the exposure determinations based on lighting measurements, to provide a faster shutter speed for "pan" and "tele" settings, than for "normal" settings.

FIG. 3 depicts a microcomputer control device 33 connected to the exposure control circuit 30, the LED's 21, 22, 23, 24 and the switches SW1, SW2, SW3, SW4. The microcomputer 33 is also connected to a shutter switch 35 and to a lens aperture setting device 36.

The microcomputer device 33 preferably includes a look-up table of exposure values which are correlated as in conventional systems for the measure of brightness of reflected light provided by the photocell 31. However, in departure from known systems, the provision is also made for altering the exposure parameters set based on measured light intensity, to increase the shutter speed by one or more settings according to which ones of the switches SW1-SW4 are closed.

In accordance with the invention, when a selection of pseudo telephoto or pseudo panoramic exposure is made, the usual exposure values (aperture and/or shutter speed) determined from the look-up table will be modified to decrease the normal shutter "open" time and provide a corresponding wider aperture setting or, alternatively, where light level is too low for a particular shutter speed, activate a flash circuit 37.

One implementation of an exposure control system for a tele/pan camera provides an expanded look-up table. In response to indication of a certain light level, along with an indicated selection of closure of switches SW1-SW4 corresponding to a pseudo format setting, a higher shutter speed setting is chosen for control of shutter switch 35 and a corresponding wider aperture setting is chosen for control of the aperture setting device 36. Another implementation of the invention, uses a standard look-up table to choose "normal" exposure values based on measured light intensity and then, in accordance with closure of switches SW1-SW4, modifies that selection through the use of known algorithms to vary the retrieved aperture setting, in response to a preestablished reduction in retrieved shutter time.

In accordance with the invention, the effect of camera or subject motion in a tele/pan camera on a portion of a negative image to be enlarged with a greater magnification for "pan" o "tele" prints than for "normal" prints, is reduced with corresponding reduction in blurring by selection of a higher shutter speed when one of the pseudo formats is selected. A corresponding change in aperture setting or activation of a flash, is made to accommodate the change in shutter speed.

Those skilled in the art to which the invention relates will understand that the foregoing detailed description is intended to be merely exemplary and not exclusive and that various substitutions and modifications may be made to the described embodiment without departing from the spirit and scope of the invention as described by the claims below.

What is claimed is:

1. A photographic camera for exposing a film frame for use in producing a pseudo telephoto print, said camera comprising:
   an objective lens;
   means for selecting a pseudo telephoto field of view reduced from the actual field of view of said objective lens;
   exposure control means including a photosensitive element disposed to receive ambient light;
   light control means, responsive to the selection of a pseudo telephoto field of view, for controlling the amount of light reaching said photosensitive element in accordance with the amount of light available to the pseudo telephoto field of view;
   means, responsive to said ambient light reaching said photosensitive element, for determining shutter speed and aperture values for proper exposure of said film frame; and
   means, responsive to the selection of a pseudo telephoto field of view, for modifying said determined shutter speed value to a faster value and for modifying said determined aperture value to a correspondingly wider aperture value consistent with said proper exposure.

2. In a photographic camera having an objective lens with an actual field of view for exposing a film frame which, if fully printed during subsequent processing, will provide a normal print having a field of view corresponding to said actual field of view; said camera further including means for selecting between a normal print setting an a pseudo format print setting; means, responsive to said selecting means, for coding said film when said pseudo format print setting is selected to identify a portion less than all of said frame which, when said portion is printed during said subsequent processing, will provide a pseudo format print having a field of view different from said actual field of view; and exposure control means for establishing camera parameters for proper exposure of said frame; the improvement comprising: said exposure control means including means, responsive to said selecting means, for establishing a faster shutter speed for exposure of said frame when said pseudo format print setting is selected than when said normal print setting is selected.

3. An improvement as in claim 2, said camera exposure control means further comprising a photosensitive element disposed to receive ambient light; and means, responsive to said ambient light received by said photosensitive element, for determining aperture values for proper exposure of said frame based on light reflected from that part of said subject to be photographed which corresponds to the field of view of the selected print; and wherein said improvement further comprises said exposure control means including means, responsive to said selecting means, for establishing a wider aperture for exposure of said frame when said pseudo format print setting is selected than when said normal print setting is selected.

4. A method for automatically selecting camera parameters for the proper exposure of a film frame in a camera having an objective lens with an actual field of view; means for selecting between normal print and pseudo format print settings; means, responsive to said selecting means, for coding said film to identify all of said frame for printing during subsequent processing to provide a print having a field of view corresponding to said actual field of view if said normal print setting is selected, and to identify a portion less than all of said frame for printing during subsequent processing to provide a print having a field of view different from said actual field of view if said pseudo format print setting is selected; and exposure control means for automatically establishing camera parameters for proper exposure of said frame; said method comprising the steps of:
   selecting between said normal print and said pseudo format print settings using said selecting means;
   in response to said selected setting, establishing said camera parameters for exposure of said frame suing said exposure control means, so that a faster shutter speed will be selected for exposure of said frame for said pseudo format print setting than for said normal print setting.

5. A method as is claim 4, wherein said camera parameters are established by means of a microcomputer using a look up table.

6. A method as in claim 4, wherein said method further comprises the steps of:
   exposing said frame using said established parameters;
   coding said film to identify the portion of said frame to be printed corresponding to the selected setting; and
   printing said exposed frame by masking said frame during enlargement in accordance with said coding to provide a print having a field of view corresponding to the selected setting.

* * * * *